United States Patent [19]
Hersch et al.

[11] Patent Number: 5,796,409
[45] Date of Patent: Aug. 18, 1998

[54] METHOD FOR PRODUCING CONTRAST-CONTROLLED GRAYSCALE CHARACTERS

[75] Inventors: Roger D. Hersch, Epalinges; Claude Betrisey, Lausanne, both of Switzerland; Justin Bur, St. Laurent, Canada

[73] Assignee: Ecole Polytechnique Fédérale de Lausanne, Lausanne, Switzerland

[21] Appl. No.: 43,180

[22] Filed: Apr. 6, 1993

[51] Int. Cl.$^6$ ............................................. G06F 3/14
[52] U.S. Cl. ........................ 345/468; 345/472; 345/469
[58] Field of Search ................................ 395/150, 151, 395/102, 109, 805, 167, 168, 169, 170, 171, 172; 345/143, 144; 382/272, 273, 274

[56] References Cited

U.S. PATENT DOCUMENTS

| | | | |
|---|---|---|---|
| 4,785,391 | 11/1988 | Apley et al. | 395/150 |
| 4,907,282 | 3/1990 | Daly et al. | 382/242 |
| 4,962,465 | 10/1990 | Saito et al. | 395/150 |
| 5,099,435 | 3/1992 | Collins et al. | 395/150 |
| 5,159,668 | 10/1992 | Kaasila | 395/151 |
| 5,201,032 | 4/1993 | Kurose | 395/150 |
| 5,280,576 | 1/1994 | Cao | 395/150 |
| 5,301,267 | 4/1994 | Hassett et al. | 395/150 |
| 5,309,552 | 5/1994 | Horton et al. | 395/131 |
| 5,309,554 | 5/1994 | Ito | 395/150 |
| 5,325,479 | 6/1994 | Kaasila | 395/151 |

FOREIGN PATENT DOCUMENTS

| | | |
|---|---|---|
| 132455 | 7/1983 | European Pat. Off. |
| 2004502 | 9/1978 | United Kingdom |

OTHER PUBLICATIONS

Computer Dictionary, Microsoft Press, 1994, p. 305.
John E. Warnock, The Display of Characters Using Gray Level Sample Arrays, Proceedings SIGGRAPH'80, ACM Computer Graphics, vol. 14, No. 3, pp. 302–307.
H. Abe, et al. Quality Gray–scale Kanji Font Generation Using Automatic Stroke Displacement, Raster Imaging and Digital Typography (Eds R.A. Morris, J. André), Cambridge University Press, 1991, pp. 147–155.

*Primary Examiner*—Mark K. Zimmerman
*Assistant Examiner*—Stephen Hong
*Attorney, Agent, or Firm*—Page Lohr Associates

[57] ABSTRACT

The invention teaches grayscale specific character outline modification techniques for synthesizing contrast controlled grayscale pixmap characters of improved appearance at any resolution and size. In addition, methods for computing the visually optimal spacing of any two characters taking into account outline shape modifications induced by the character contrast control method. The synthesis of contrast controlled grayscale characters may include the following outline modification steps: (1) modifying the height of the character by placing its reference lines on pixel boundaries of the target pixel array, (2) verifying and correcting the width of character strokes such as bars and curved stems, (3) modifying the placement of vertical and horizontal bars and of bar-like terminal elements so as to ensure that each bar or terminal element has at least one high-contrast edge, (4) modifying the placement of vertical and horizontal curved stems so as to ensure similar optical correction behavior and similar intensity profile behavior of curved character parts throughout the characters of the considered character set. Visually optimal spacing of characters is obtained by converting the geometric space between the right, respectively left border of a character and its right, respectively left reference lines into its visually perceived equivalent. Converting between geometric and visually perceived spaces implies smoothing out the right, respectively left borders of the character and replacing them by virtual borders which represent the perceived space boundaries. The optimal visual distance between the origin of the first character and the origin of the next one is obtained by requiring the characters to have a perceived visual space equal or close to an ideal perceived visual space called ideal optical space extracted from adequately spaced character pairs such as "nn" for lower-case and "HH" for capital letters.

4 Claims, 10 Drawing Sheets

PRIOR ART

METHOD FOR PRODUCING CONTRAST-CONTROLLED GRAYSCALE CHARACTERS

REFERENCES CITED

Adobe Type 1 Font Format, Addison-Wesley, 1990.

F. Crow, "The Use of Grayscale for Improved Raster Display of Vectors and Characters", ACM Computer Graphics, Vol 12, No 3, pp 1–5, August 1978.

R.D. Hersch, "Character Generation under Grid-Constraints", Proceedings SIGGRAPH'87, ACM Computer Graphics, Vol 21, No 4, July 1987, pp. 243–252

R.D. Hersch, "Introduction to Font Rasterization", Raster Imaging and Digital Typography (Andre, Hersch, eds.), Cambridge University Press, 1989, pp. 1–13

R.D. Hersch, C. Betrisey, "Model-based Matching and Hinting of Fonts", Proceedings SIGGRAPH'91, ACM Computer Graphics, Vol 25, No 4, pp 71–80.

D. Knuth, Tex and Metafont, American Mathematical Society and Digital Press, 1979

J.E. Warnock, "The Display of Characters Using Gray Level Sample Arrays", Siggraph'80 Proceedings, published in ACM Computer Graphics, Vol 14, No 3, pp. 302–307

"Elektronische Modifikation grafischer und verbalgrafischer Zeichen, Deutscher Drucker, Nr 25, 23.8.1979, pp.4–8.

U.S. Pat. No. 4,785,391, 11/88, 364/518

BACKGROUND OF THE INVENTION

This invention relates to the art of synthesizing grayscale characters on variable intensity pixmap displays or printing devices. More specifically, it relates to the generation of contrast-controlled pixmap character representations at selectable resolution and point sizes, by applying to their outline description modifications which are specially suited for the production of contrast-enhanced and uniformly appearing grayscale characters.

Previous attempts to generate grayscale characters at low resolution (72 dpi to 300 dpi) for variable intensity displays used well-known image processing techniques (low-pass filtering and resampling) for scaling down a high-resolution master character pixmap image into a low-resolution displayable image. The article by J.E. Warnock, "The Display of Characters Using Gray Level Sample Arrays", Siggraph'80 Proceedings, published in ACM Computer Graphics, Vol 14, No 3, pp. 302–307 can be considered representative of these attempts. Further techniques commonly used for generating pixmap characters compute for each pixel the percentage of their surface covered by the down-scaled master character. This coverage percentage directly determines the pixel's intensity. Representative of these grayscaling techniques is the article by F. Crow, "The Use of Grayscale for Improved Raster Display of Vectors and Characters", ACM Computer Graphics, Vol 12, No 3, pp 1–5, August 1978. The quality of grayscale characters produced by such methods is rather limited: the resulting characters look fuzzy, stems and serifs which should look the same within one character and throughout several characters have a dissimilar appearance.

Changing the shapes of characters by outline modifications has been known in the prior art since the seventies. For example, D. Knuth describes in his book "Tex and Metafont", published in 1979 by American Mathematical Society and Digital Press, a language for modifying the shapes and outlines of characters. Since the end of the seventies, outline modifications have been used for grid-fitting hinted outline characters to a binary sampling grid in order to produce bilevel raster characters which respect important relationships between character shape parts of the high-resolution master character. An early description of such outline modification and grid-fitting techniques can be found in: "Elektronische Modifikation grafischer und verbalgrafischer Zeichen, Deutscher Drucker, Nr 25, 23.8.1979, pp.4–8.

The first inventor, R.D. Hersch, developed in 1986 and published in 1987 his own method for grid-fitting hinted outline characters. A detailed description of this method and of related aspects can be found in R. D. Hersch, "Character Generation under Grid-Constraints", Proceedings SIGGRAPH'87, ACM Computer Graphics, Vol 21, No 4, July 1987, pp. 243–252, in R.D. Hersch, "Introduction to Font Rasterization", Raster Imaging and Digital Typography (Andre, Hersch, eds.), Cambridge University Press, 1989, pp. 1–13 and in R. D. Hersch, C. Betrisey, "Model-based Matching and Hinting of Fonts", Proceedings SIGGRAPH'91, ACM Computer Graphics, Vol 25, No 4, pp 71–80. A similar but different technique for producing bilevel raster characters from outline descriptions is described in U.S. Pat. No. 4,785,391.

Many methods exist for modifying outline characters. Each method is dedicated to a given goal. Each method is characterized by the purpose of its outline modification technique and by how it applies outline modifications to the outline character for said purpose.

The present invention includes a method for producing higher-quality grayscale characters at any size and resolution by applying to the outline of the master character a set of modifications specifically conceived for grayscale characters aimed at strengthening thin character parts (weight control), obtaining well-contrasted bars (pixmap phase control) and maintaining important relationships between character shape parts of the master character set on the synthesized grayscale pixmap character set. The invention also includes a method for the visually optimal spacing of pairs of such contrast-controlled grayscale characters.

SUMMARY

The invention includes a character contrast control technique which enables grayscale pixmap characters of improved appearance to be produced and a technique for computing the visually optimal placement between any two pairs of characters. While the first method can be used without the second method to generate grayscale characters for displays or printers, only the combination of both methods produces high display quality. Thanks to their weight, phase and spacing control techniques, these methods produce well contrasted grayscale characters of a much higher quality than the grayscale characters produced by conventional techniques. Therefore, these methods can be used to improve the quality of a variety of devices capable of generating characters. Such improved devices are also part of the invention.

The character contrast control technique for producing well contrasted and uniformly appearing grayscale characters prefers as input a hinted character outline description whose hints comprise control information indicating the points which define the location of bars, of serifs, of curved character parts and of other character elements such as terminals. The hints may also describe which portions of the characters should be displaced and stretched in order to modify the width and the position (phase) of the different character elements with respect to the grid. At rendering time, contrast control is obtained by applying grayscale-specific modifications to the character outline, using the hinting information. This set of modifications includes the displacement of horizontal and vertical bar boundaries, with one boundary of each bar placed on a pixel boundary, thereby producing one high-contrast single edge. It also includes possible enlargment of bars and curved stems in order to respect a minimal width and to ensure that all important character parts, even at small sizes, have a sufficiently strong appearence. It further includes the phase placement of curved stems on the grid, in order to produce similar gray intensity profiles throughout similar curved stems.

The second method produces optimally spaced characters by computing the perceived visual space between any pair of characters. By applying a given set of transformations to the geometric space between two characters, an approximation of the perceived visual space is obtained. Spacing values are computed so as to equalize the perceived visual space to the spacing of a well spaced character pair, for example the character pairs "nn" or "HH", which are optimally spaced by the font designer.

Both the character contrast control technique for producing well contrasted and uniformly appearing grayscale characters as well as the technique for producing optimally spaced characters can be effectively used for devices such as displays, terminals, printers, photocomposers or communication equipment. Devices comprising such techniques are covered by the present invention.

Objects of the invention are techniques for producing from an outline description of a character a grayscale pixmap representation of said character with strengthened thin character parts, well contrasted bars, and with important relationships between character shape parts such as similarity of bars, stems, and serifs preserved throughout the characters of a given character set. Such techniques include outline character modifications specifically conceived for grayscale characters, aiming at strengthening thin character parts, obtaining well contrasted bars and achieving similarity when displaying similar character elements.

Objects of the invention are also techniques for producing well spaced characters using visually optimal spacing techniques to compute the origin of a following character from the origin of a present character. Such techniques include transformations which enable the visually perceived equivalent of two characters to be produced from the geometric space between them. These techniques also include a method for obtaining the optimal distance between two characters by equalizing their perceived visual space to the perceived visual space between two characters which have been well spaced by design such as the "nn" and "HH" character combinations.

These objects and other objects and features of the invention will best be understood from the detailed description of the invention.

FIGURES

FIG. 1 gives an example of an outline character and its corresponding set of hints representing the character's additional control information.

FIG. 2 shows how pixel intensity values of the grayscale pixmap character are computed by evaluating the pixel surface covered by the high-resolution master character.

FIGS. 3A–3F give an example of grayscale-specific modifications applied to the outline of character "n" enabling the contrast of its bars to be improved by placement of each left bar boundary on pixel boundaries.

FIG. 4 gives an example of grayscale-specific modifications applied to the outline of character "n" at low size and resolution, enabling the contrast of its bars to be improved by placement of each left bar boundary on pixel boundaries and ensuring a minimal weight of its thin stroke parts by enlarging their width to a size close to one pixel width.

FIG. 5 gives an example of grayscale-specific modifications applied to the outline of character "0" in order to ensure a uniform curve behaviour throughout similar characters and a minimal weight of its thin stroke parts.

DETAILED DESCRIPTION

The display of contrast-controlled grayscale characters produces the best results if each individual character is adequatly rendered and, if necessary, stored in a character buffer for further use, and if the spacing between each character and the previous one is adapted to their respective shape combination, or, more precisely, to the perceived visual space between them. The contrast controlled rendering of individual grayscale characters and the optimal spacing of each pair of characters should be used jointly in order to achieve the best overall display quality. In the following description, the terms grayscale character and variable intensity character are interchangeable. Both terms refer to a character pixmap image, where the pixmap is composed of pixels having a given number of intensity levels, for example 4, 8, 16, 32, 64, 128 or 256 levels. Computers and terminals display the characters with gray values corresponding to pixel intensities. Variable dot size printers print dots whose size depends on the pixel intensity level.

Figure 3:
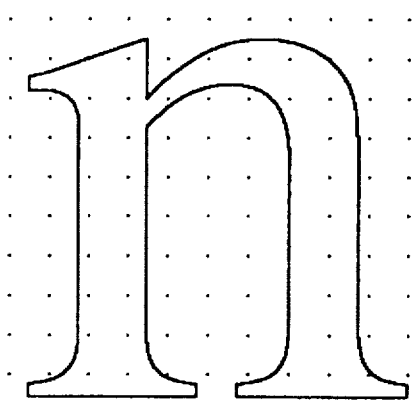
Figure 3:
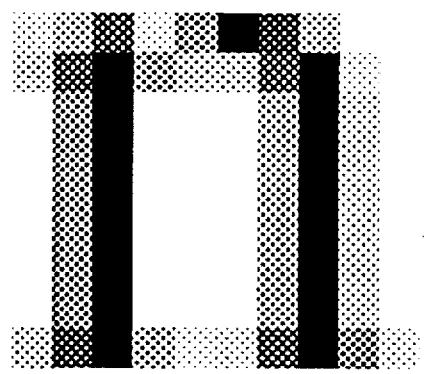
Figure 3:
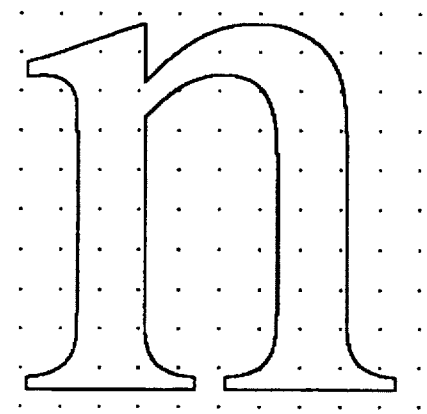
Figure 3:
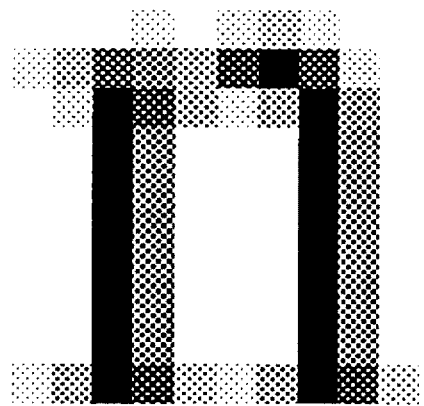
Figure 3:
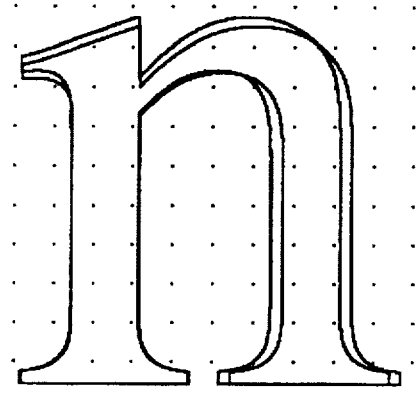
Figure 3:
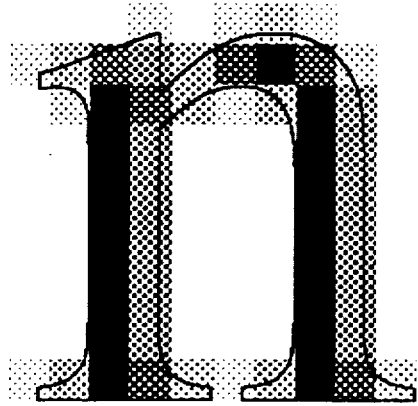
Figure 4:
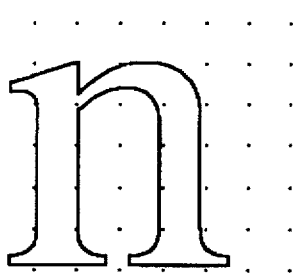
Figure 4:
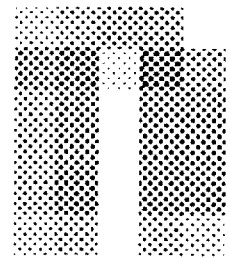
Figure 4:
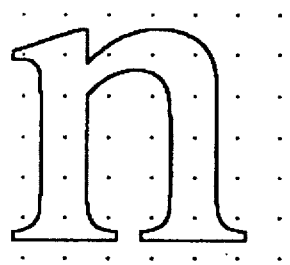
Figure 4:
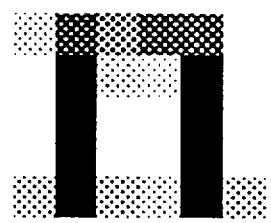
Figure 4:
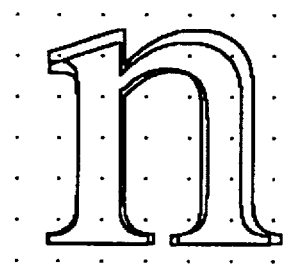
Figure 4:
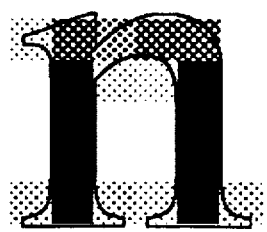

1. Synthesis of individual contrast controlled grayscale characters from outline characters by weight and phase control Previous methods to generate grayscale characters at low resolution (72 to 300 dpi) produce fuzzy looking characters having dissimilar character elements such as dissimilar bars, dissimilar round strokes and dissimilar serifs (example: FIG. 3b). Furthermore, bars tend to have low contrast edges and at small sizes, the thin parts of grayscale characters produced in this manner are barely visible and tend to disappear (example: FIG. 4b). In this invention, we present an original method comprising a set of outline modification procedures specifically created for solving the problems of dissimilar grayscale character elements having different intensity profiles, low contrast edge bars and disappearing character parts. Such outline modification procedures are specific to grayscale characters and have the goal of controlling the grayscale intensity profile of bars and curved strokes. Furthermore, they ensure that thin character parts are enlarged and thereby represented by sufficiently strong gray levels to be well perceived by the human viewer. These outline modification procedures are original and differ completely from outline modifications used to produce bi-level characters.

Figure 1:
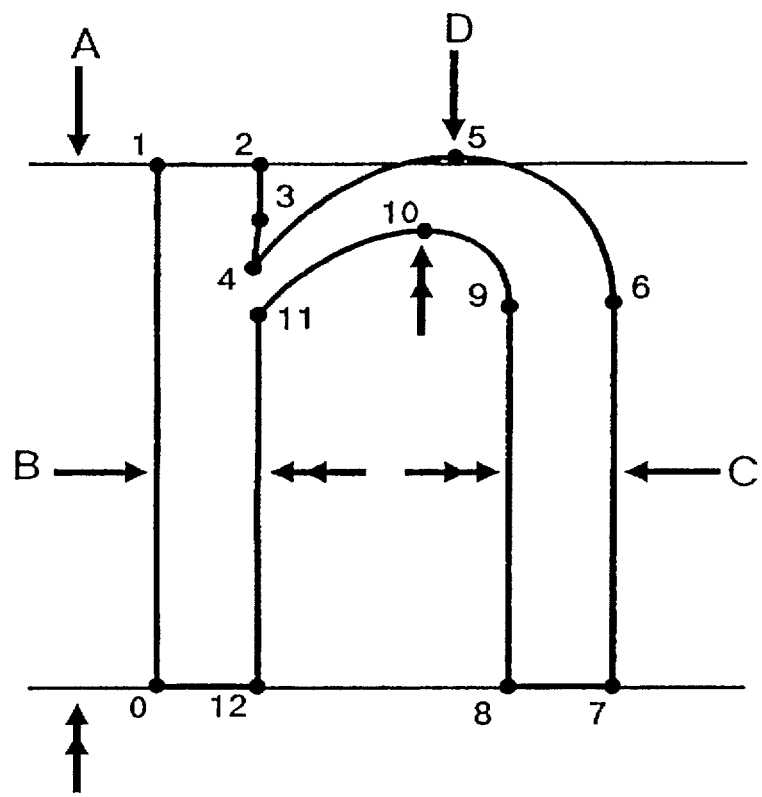

The presently described method for generating contrast controlled grayscale characters assumes that the input is a hinted character description scaled to the target display size. Hinted character descriptions are usually given by an outline description comprising additional control information (hints) which specify the respective locations of the character elements such as horizontal bars, vertical bars, horizontal tangential locations of curved character parts, vertical tangential locations of curved character parts, reference lines, optical correction lines, serif locations, junction points of character elements. If such hinted character information is not part of the input character description, it may be generated by a special preprocessing program and then used to synthesize contrast-controlled grayscale characters. FIG. 1 gives an example of such a set of hints (control information). Character outline description and hinting information may also take other forms, for example the Type 1 format published in the book Adobe Type 1 Font Format, Addison-Wesley, 1990.

The synthesis of contrast controlled grayscale characters may comprise the following outline modification steps:

a) modifying the height of the character by placing its reference lines (for latin characters, its baseline, x-height line and capsline) on pixel boundaries of the target pixel array, b) verifying and if necessary enlarging the width of each individual character stroke (bars, curved stems, terminals), in order to ensure a minimal stroke width close to one pixel c) modifying the placement of vertical and horizontal bars and of terminal elements having a horizontal or vertical edge so as to ensure that each bar or terminal element has at least one high-contrast edge, d) modifying the placement of vertical and horizontal curved stems so as to ensure similar optical correction behaviour and similar intensity profile behaviour of curved character parts throughout the characters of the considered character set.

Figure 2:
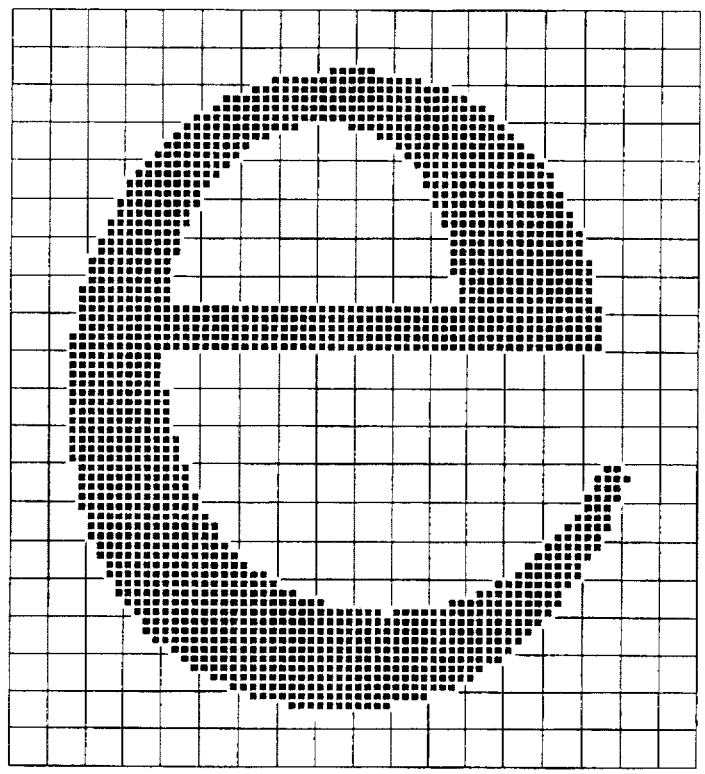
Figure 2:
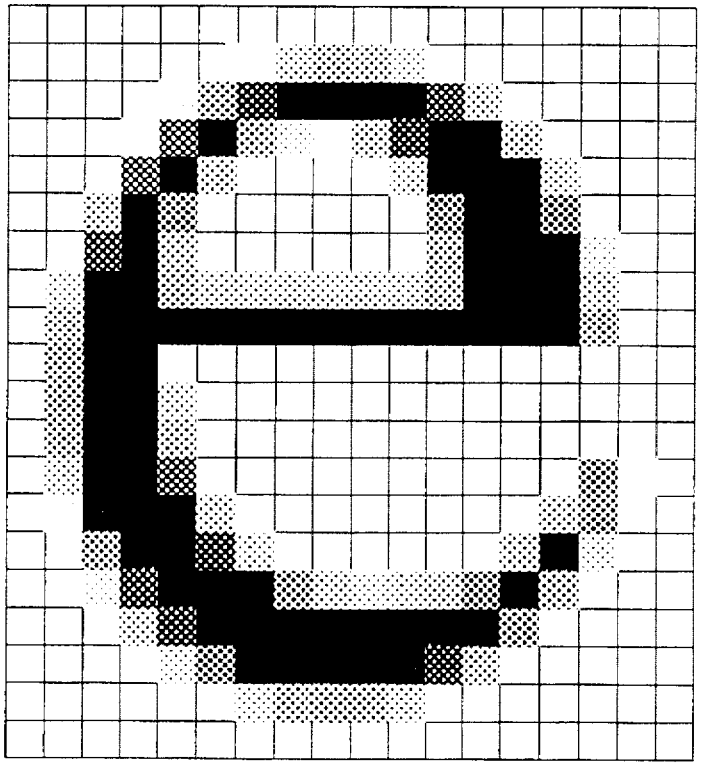

Once the character outline has been modified according to one or several of the outline modification steps (a), (b), (c), (d), the intensity levels of each pixel of the target pixmap array can be computed in ways known in the art, for example by the following scan-conversion method, which computes an approximation of the surface coverage of each pixel by said modified character surface. Said modified outline character is scan-converted to a binary raster image (bitmap) k times the size of the target pixmap display, k being a positive integer greater than one. This step produces for each displayable pixel a k×k binary bitmap. The intensity level of each displayed pixel is given by the ratio of the number of active bitmap elements in the k×k bitmap divided by $k^2$. FIG. 2 illustrates the computation of the pixel intensity levels by scan-converting the modified outline character to a bitmap having 4 times the resolution of the target display pixmap.

Let us now describe in detail outline modification steps (a), (b), (c), (d). While outline modification step (a) is known from prior art and applied to grayscale characters, outline modification steps (b), (c) and (d) are completely original and only make sense for producing contrast-controlled grayscale characters.

Outline modification in the context of grayscale characters is based on the fact that the phase of a surface contour with respect to the display pixmap grid determines, after scan-conversion, the background to character or white to black discrete intensity profile behaviour.

Outline modification step (a) places horizontal reference lines at pixel boundaries and therefore produces highly contrasted horizontal bars and serifs adjacent to the horizontal reference lines (for example horizontal bars in characters "z", "E", foot serifs in many characters such as "n", "m", "h", "H", "M"). Outline modification step (a) implies a linear vertical scaling step applied to the complete outline character which changes the original x-height or caps-height to an integer number of pixels.

Outline modification steps (b) and (c) for the contrast control of bars are generally integrated into one processing step. A procedure associated to outline modification steps (b) and (c) computes from the hinting information the width of the considered vertical or horizontal bar. If the width of the bar is below a certain value, for example ¾ of a pixel width, the bar is enlarged by an adequate amount so that its final size comes close to one pixel width. For this purpose, it is possible to take the mean value between a reasonably wide bar, for example 1.5 pixel wide, and the actual bar width; this value becomes the new corrected bar width. The newly computed bar is then placed on the grid in such a way that one of its bar boundaries, preferably the left one in the case of a vertical bar, is placed on pixel boundaries. This ensures that one side of the produced discrete bar will have a high intensity contrast. The newly computed and placed bar can be obtained from the unmodified original bar by computing one displacement applied to the original first bar boundary and a second displacement applied to the original second bar boundary. If, in the vertical bar example, the left bar boundary is to be placed between pixel boundaries, the procedure may choose the closest pixel boundary either on the left or right side of the bar boundary and compute accordingly the required displacement to be applied to the original left boundary. The position of the second bar boundary is defined by the new position of the first bar boundary and the previously computed bar width. The displacement to be applied to the second original bar boundary is computed by subtracting its original position from its new position. Once these two displacements have been computed and the boundaries of the modified bar have been adequately placed on the grid, the remaining parts of the character will be adapted to this new bar location and width in ways known in the art (such as grid-fitting outline characters to a binary sampling grid). Outline modification steps (b) and (c), for the contrast control of bars can also be used to produce sharp discrete terminals and stroke ends if the terminals are treated as bars. FIGS. 3a and 4a show the original character outline scaled at two different sizes without outline modification. FIGS. 3b and 4b show their scan-converted pixmap representation. FIGS. 3c and 3d show primarly the effect of outline modification step (c) and FIGS. 4c and 4d show primarly the effect of outline adapatation steps (b) and (c). FIGS. 3e and 4e show the character outline shape variations produced by the outline modification steps. FIGS. 3f and 4f show the superposition of the modified outlines and their scan-converted grayscale pixmaps.

As a consequence of outline modification steps (b) and (c), serifs located at bar ends will have the same phase with respect to the pixmap grid and therefore the same appearance.

Figure 5:
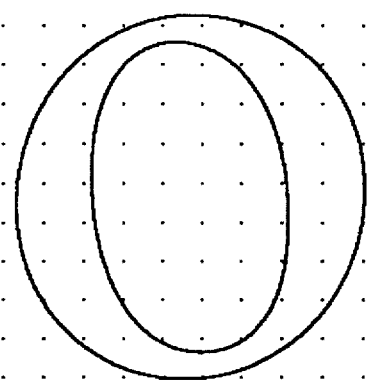
Figure 5:
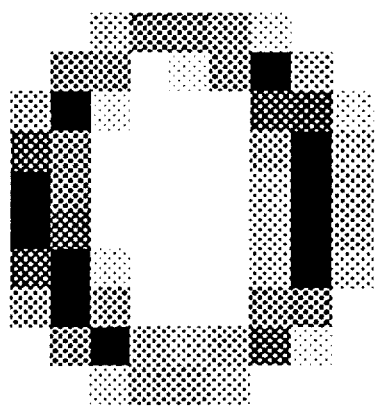
Figure 5:
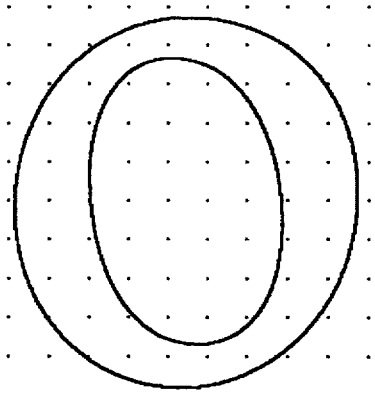
Figure 5:
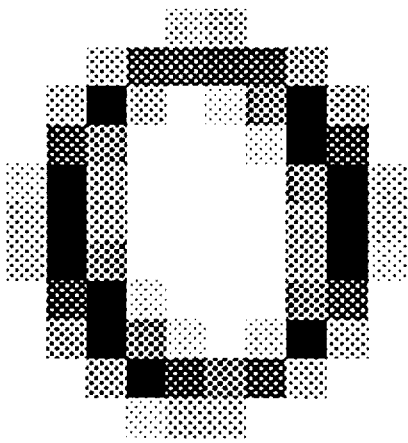
Figure 5:
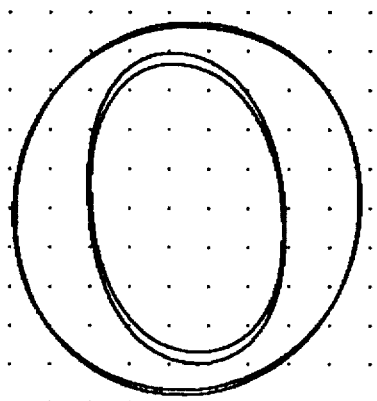
Figure 5:
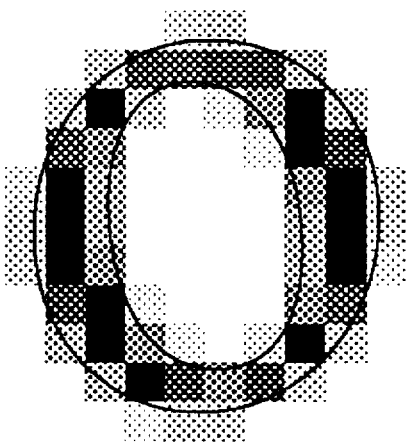
Figure 6:
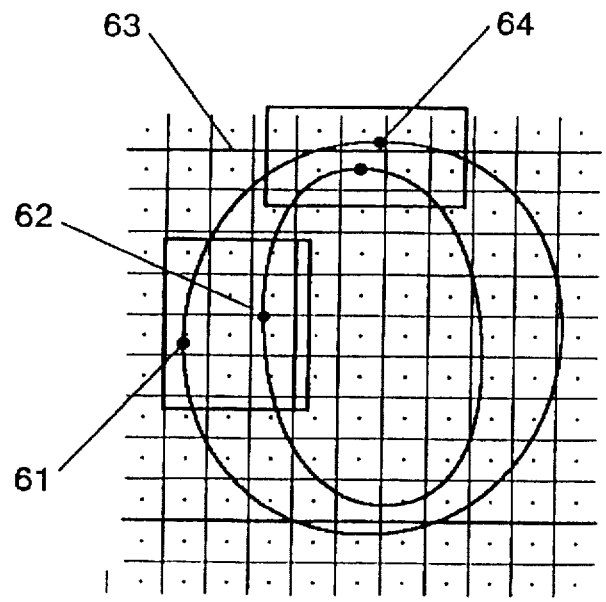
FIG. 6 shows the application of grayscale-specific outline modifications to curved stems in order to ensure for each curved stem a minimal width of approximatively one pixel and to obtain from each curved stem the same intensity profile behavior at its horizontal and vertical extremity points.
Figure 6:
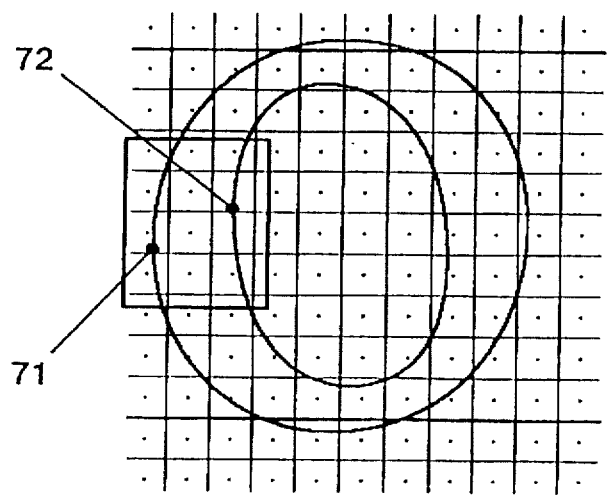
Figure 6:
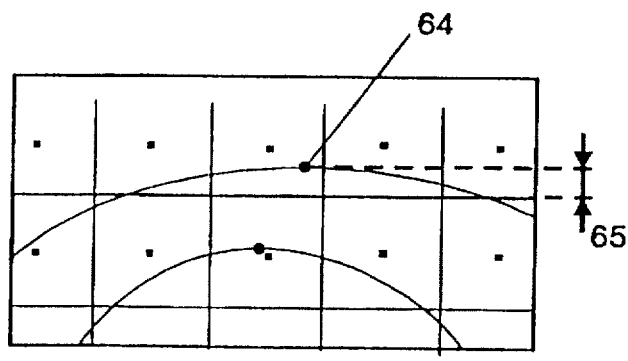
Figure 6:
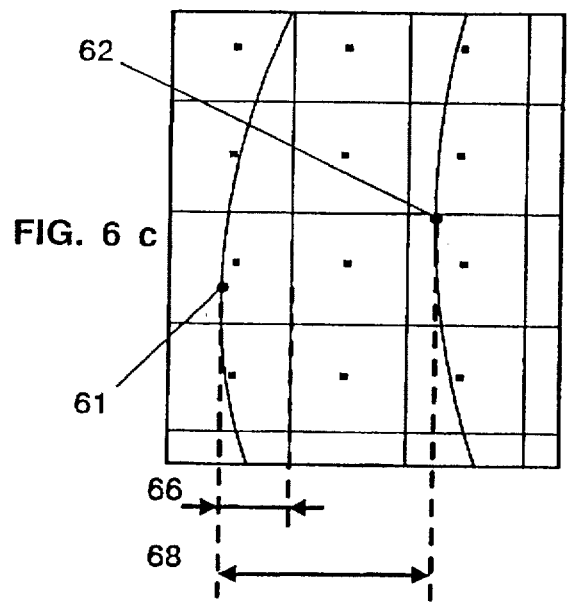
Figure 6:
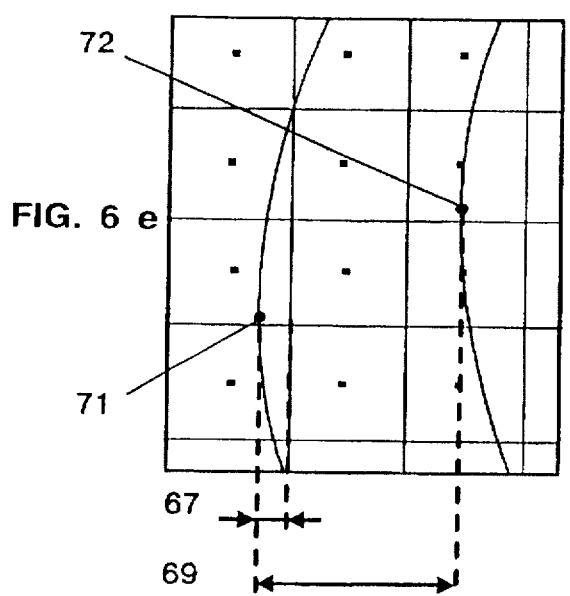

Outline modification steps (b) and (d) may also be integrated within one processing step. In the same way as for the weight control of bars, the width of curved stems at their horizontal and vertical extrema is computed by the outline modification procedure associated with steps (b) and (d), which uses hinting information indicating the location of curved stem interior and exterior extrema points. If the width (FIG. 6, 68) of a curved stem is below a certain value, for example ¾ of a pixel width, the curved stem is enlarged by an adequate amount so that its final size comes close to one pixel width. For this purpose, it is possible to take the mean value between a reasonably wide curved stem, for example 1.5 pixels wide, and the actual curved stem width; this value becomes the new corrected curve stem width. The curved stem is then to be placed on the grid in such a way that the phase of the extremum of the external contour 71 of the considered curved stem with respect to the grid is the same as the phase of the contour extremum at the optical correction point 64 of character "O" for capital letters, or respectively "o" for lower-case letters (preferred phase), after application of outline modification step (a). This phase is the preferred phase and determines a uniform contrast intensity profile for all other curved stems at the same character size and pixmap resolution. The new curved stem is to be obtained from the original unmodified curved stem by one displacement applied to the external curved stem contour boundary 61 point and another displacement applied to the internal curved stem boundary 62. The computation of these two displacements may proceed as follows. The procedure for outline modification steps (b) and (d) will find for the preferred phase location a solution on both sides of the original external curved stem contour extremum 61. The side closest to the original external curved stem contour may be chosen as the new target location 71 of the curved stem contour extremum. The displacement to be applied to the external curved stem extremum is computed by substracting from the newly computed target location 71 its original location 61. The new location of the internal extremum 72 is given by the new location of the external extremum 71 minus or plus (depending on the positive or negative orientation of the curved stem) the newly computed curved stem width 69. The displacement to be applied to the original internal extremum of the curved stem is obtained by substracting its original location 62 from its new location 72. Once computed, these displacements are propagated along the curved stem contours using grid fitting techniques as is known in the art. FIGS. 5a and 5b show the original character and its grayscale representation without any outline modification steps. FIGS. 5c and 5d show the modified outline character and its scan-converted pixmap representation. FIG. 5e shows the character outline shape variations produced by the outline modification steps. FIG. 5f shows the superposition of the modified outlines and their scan-converted grayscale pixmaps. This figure also shows that the phases of vertical and horizontal external contour extrema with respect to the pixmap grid and relative to the curved stem orientation are similar. FIG. 6a shows the phase 65 of the contour of character "o" at the optical correction point 64, obtained after having applied outline modification step (a) to the original character outline. It also shows the original curved stem given by its extrema 61 and 62. FIGS. 6b and 6c are enlargments of FIG. 6a. FIG. 6d and its enlargment FIG. 6e show the same character after outline modification steps (b) and (d). The grid of FIG. 6d is shifted by one grid element to the left when compared to the grid of FIG. 6a. One can clearly see that after said outline modifications, all curved stems have a similar phase (65,67) with respect to the grid and to their respective orientations.

The set of outline modification steps (b), (c) and (d) is specific to the generation of contrast-controlled grayscale characters and is different from outline modifications used for producing bilevel raster characters. The generation of bilevel characters does not require any contrast control, since at only two levels of intensity the contrast is always maximal. Bilevel character generation methods are mostly concerned with the preservation of identical discrete sizes of similar sized original elements and with avoiding small irregularities of the original master outline character generating large irregularities in the produced bilevel raster character. Grayscale characters however can easily tolerate small size deviations in the original master outline character. Such deviations or inaccuracies may produce slight, nearly imperceptible variations of gray levels at the border of the considered character element. The main problem with grayscale is to ensure high-contrast transition between background colour (white) and character colour (black) as well as sufficiently strong grayscale representation of thin character parts. These differences between bilevel and grayscale character generation explain why the outline modification strategies used for grayscale characters differ from those used for bilevel character generation.

2. Visually optimal spacing of characters

It is well known in the art that the best spacing between two characters depends on the shape of those characters and especially on the perceived visual space between both characters. Applying kerning techniques to text printed at high-resolution slightly improves its quality. Due to the low-resolution of the considered display device and to the rendition of grayscale characters by weight and phase control, spacing between grayscale characters is critical. Using automatic kerning techniques substantially improves the quality of the displayed text by producing visually uniform spacing between characters. Any existing automatic kerning method may be used for computing the placement of characters at high resolution. We present here an original method for optimally spacing successive characters, which takes into account character shape variations due to weight and phase control and is therefore more accurate than a general-purpose rendering size-independent automatic kerning technique. While this original spacing method is described in the context of grayscale character display, it can be also used for the spacing of grid-fitted bilevel characters, for general purpose character kerning, or as a method to automatically compute kerning values for character pairs.

Figure 7:
FIG. 7 shows how the successive transformations are applied to the geometric intercharacter space in order to obtain an approximation of its corresponding perceived visual space.
Figure 8:
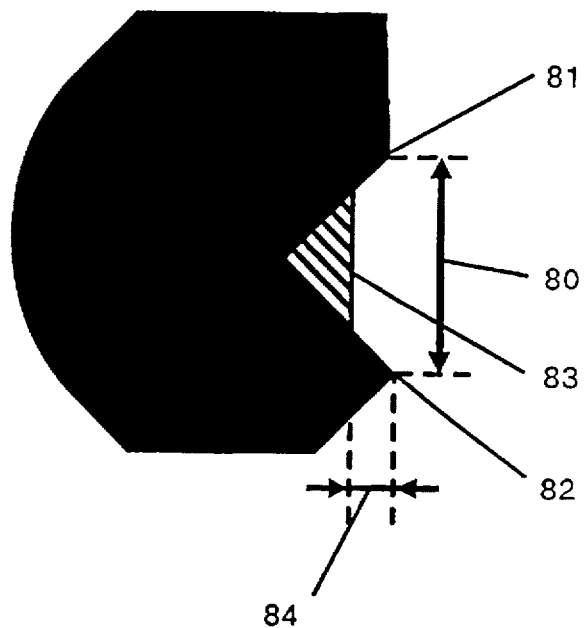
FIG. 8 Shows the details of the transformation described in FIG. 7d which limits the depth of the white space contributing to the perceived visual space.
Figure 8:
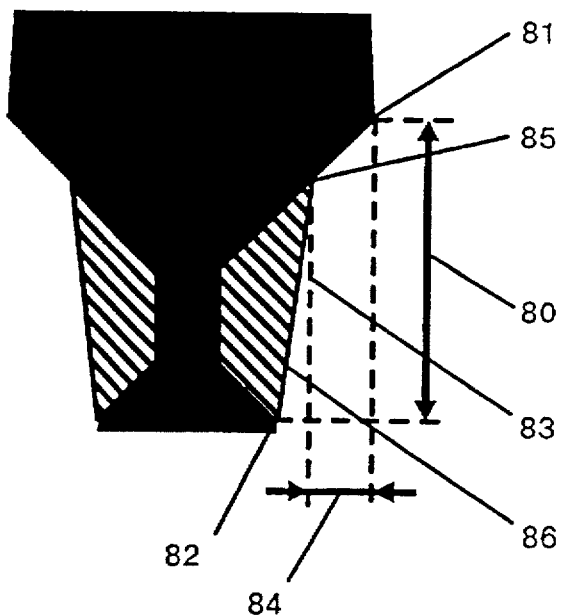

The original visually optimal character spacing method which is part of the present invention is based on a model which provides the means to compute the visually perceived space between two characters using the resulting geometry of the two character shapes obtained after having applied weight and phase control to the character shapes. Converting the geometric intercharacter space to the visually perceived intercharacter space comprises the following transformations (FIG. 7), assuming that the background is white and that the displayed characters are black:

A) Eliminate white space interior to the character shape or hidden behind vertical character elements (FIG. 7b).

B) Limit interior white concavities to a surface bounded by ±45° incident straight line segments (FIG. 7c)

C) Limit the depth of the interior white space of cavities to a value proportional to the size of the cavity (FIG. 7d).

D) Limit the depth of the contributing white space to an absolute value given as a proportion of the character height, i.e. for capitals the caps-height and for lower-case characters the x-height (FIG. 7e).

The remaining space between two characters after transformations A, B, C and D is a value giving the amount of visually perceived space between two characters which have been appropriately modified by weight and phase control techniques. To produce uniformly spaced characters, the visual space computed in this manner is reduced or enlarged so that it equals an ideal optical space given by the visual space between two characters which have been optimally spaced by the type designer. For latin characters, this is generally the visual space between two successive characters "nn" for lower-case and "HH" for capitals. The amount of visual space reduction or enlargement divided by the height of the characters (caps-height for capitals, x-height for lower-case characters) gives a negative or positive kerning value which provides a means to improve character spacing.

In a preferred embodiment of a rendering-dependent visually optimal character spacing method, the pair of characters which has to be optimally spaced on the pixmap display first needs to be synthesized using the "weight and phase" contrast control character synthesizing techniques described previously. This process leads to modified outline descriptions, where each character has its left reference placed at pixel boundaries. Processing steps A, B, C and D are successively applied to said modified outline description. Processing step A is straightforward: horizontal lines are drawn through local vertical shape extrema until the next contour intersection. Each horizontal segment between a local extremum and the next shape's intersection replaces its corresponding original concave outline shape part. Completely interior outline parts are eleminated and interior white space is thus removed (FIG. 7b).

Processing step B aims at prohibiting concave outline shape parts with tangents from having slopes smaller than 1. At any outline location of the character contour processed by step A having an outline shape part in the concave part of the character shape with tangent slope s<1, a straight line with slope Isl=1 is drawn and intersected with the contour obtained by step A. This straight line segment having an angle of ±45° or −45° with the horizontal replaces its corresponding contour shape part (FIG. 7c). Processing step C limits the depth of the contributing white space to a value proportional to the cavity aperture 80, given by the vertical distance between the cavity's two horizontal maxima points 81 and 82. The cavity depth 84 is obtained by multiplying the cavity aperture by the DepthFactor parameter. Best results have been obtained with DepthFactor = 0.21. A vertical line is drawn at a horizontal position given by the x-coordinate of the horizontal maximum with the largest value 81 minus (for a right border) or plus (for a left border) the computed cavity depth 84. The intersection of this vertical line with the shape contour obtained by processing steps A and B produces a vertical line segment 83 replacing corresponding contour shape parts. In case the second horizontal maximum 82 has an x-coordinate positioned closer to the character's center of weight than the vertical line's x-coordinate, a straight line is drawn from the departure of the vertical line 85 to this second horizontal maximum 82. This straight line segment 86 replaces corresponding contour shape parts.

Processing step D gives a global depth limit to the contributing white space which is proportional to the character height:

GlobalDepthLimit=GlobalDepthParameter·CharHeight with CharHeight being the caps-height for capitals and x-height for lowercase characters. A good value for the GlobalDepthParamer is 0.25. Vertical lines located at the positions given by the shape's horizontal extrema minus (for a right border) or plus (for a left border) the GlobalDepthLimit are drawn and intersected with the character shape. Corresponding exterior vertical line segments replace shape contour parts obtained by the previous processing steps (FIG. 7e).

Figure 9:
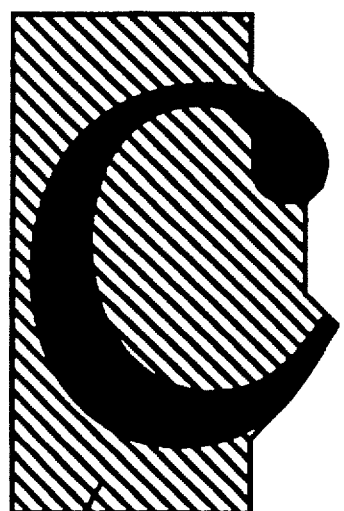
FIG. 9 shows the complement of the visual space at the right of the first character (complemented RightVisualSpace in FIG. 9a) and the visual space at the left of the second character (LeftVisualSpace in FIG. 9b), as well as the resulting visual space between the two characters (FIG. 9c).
Figure 9:
Figure 9:
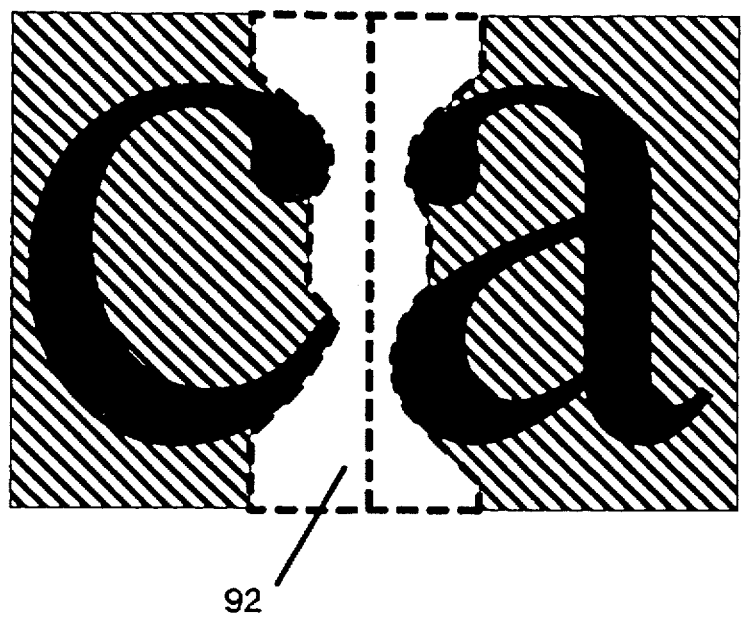

Each of the contrast-controlled outline characters having being processed by steps A,B,C and D possesses a left and a right border. The space between the left reference line and the left border is the left visual space LVS (FIG. 9,91). The space between the left reference line and the right border is the complemented right visual space CRVS (FIG. 9, 90). The ideal optical space IOS is the value taken from the visual space of two characters optimally spaced by design, such as the visually perceived intercharacter space of the "nn" character pair for lower-case and of the "HH" character pair for capitals. For spacing of character pairs composed of a capital and of a lower-case character, the mean value of the capital's ideal optical space and that of the lower-case ideal optical space is taken as the ideal optical space IOS. The optimal visual distance OVD(1stChar,2ndChar) between the original of a first character and that of a second character is computed as follows:

$$OVD(1stChar, 2ndChar) = \frac{CRVS(1stChar)}{CharHeight} + \frac{IOS}{CharHeight} - \frac{LVS(2ndChar)}{CharHeight}$$

where CharHeight is the caps-height for capitals, the x-height for lower-case characters and the mean value between caps-height and x-height for the ideal optical space value of a pair of characters composed by a capital and a lower-case character.

If necessary, the optimal visual distance OVD is increased in order to avoid parts of the two character shapes overlapping. For grayscale characters a minimal spacing value of 0.25 pixels is forseen between extrema located at similar vertical locations, for example between foot serifs. The new, if necessary increased, optimal visual distance OVD is rounded intelligently in order to have the left reference of the second character at a pixel boundary. Intelligent rounding means rounding the optimal distance in the same way as the intercharacter space IS of two by design optimally spaced characters such as "nn" for lower-case characters and "HH" for capitals is rounded. Function Frac gives the fractional part of a real number. Here is a possible definition of such an intelligent rounding function:

If 0.25<Frac(IS)<0.5=>Round(Value)=Trunc (Value+0.25);

If 0.5<Frac(IS)<0.75=>Round(Value)=Trunc (Value+0.75).

For the remaining fractional values of the intercharacter space IS the rounding function is the normal one:

Round(Value):=Trunc(Value+0.5).

The optimal visual distance Round(OVD) rounded in this manner gives the optimal spacing value in pixels from the character origin of the first character to the character origin of the second character.

The main advantage of the present invention is its ability to generate well contrasted, highly uniform and well spaced grayscale characters at any size and resolution. A further advantage of the invention is that such grayscale characters can be generated from the same hinted character description as the one used to produce bilevel characters. Therefore a computer system may produce either bilevel or grayscale characters with the same input outline character description.

The techniques described in this invention apply mainly to devices producing grayscale character images such as displays and to devices producing character images with variable intensity dots such as printers and plotters having a variable dot size.

It will be appreciated from the preceding description that the invention can be used in a variety of applications to produce scalable typeface or character images, at any resolution and size. Additionally the invention can be used to drive various devices operable for producing characters, such as displays, terminals, printers, photocomposers or communication devices.

What we claim is:

1. A method for producing from character outline descriptions improved grayscale pixmap characters with strengthened thin character parts, with bars having at least one high-contrast edge, and with a bar intensity profile and a stem intensity profile preserved across the characters of a given character set, such a method comprising the steps of:

a) modifying the heights of characters by placing their horizontal reference lines on pixel boundaries of the target pixmap, thereby producing high-contrast transitions between background colour and character colour at edges of horizontal bars adjacent to horizontal reference lines, and obtaining horizontal bars adjacent to horizontal reference lines with at least one high-contrast edge;

b) verifying if character strokes are thinner than ¾ of a pixel width and if this is the case computing a new stroke width by enlarging their width to the mean value between the measured stroke width and 1.5 pixel width, thereby obtaining characters with strengthened thin character parts;

c) modifying the placement of vertical bars by placing their left boundary on a pixel boundary thereby obtaining bars having at their left boundary a high-contrast transition between background colour and character colour and therefore at least one high-contrast edge;

d) modifying the placement of vertical and horizontal curved stems by placing the curved stem on the grid in such a way that the phase of the extremum of the external contour of the curved stem with respect to the grid is the same as the phase of the contour extremum at the optical correction point of character "O" for capital letters respectively of character "o" for lower-case letters, thereby ensuring that the same curved character parts have the same intensity profile.

2. The method of claim 1, where step c) for improving the contrast of bars by ensuring at least one high-contrast edge is also applied to character terminals and stroke ends so as to produce sharp terminals and stroke ends having at least one high contrast edge.

3. The method of claim 1, where in the case of a stroke made of a vertical bar, the steps of enlarging the width of a stroke and of modifying the placement of a vertical bar are combined into one large step comprising the computation of a new bar width, the determination of a pixel boundary nearest to the left bar boundary, the computation of a first displacement value to be applied to the left boundary, the computation of the position of a new right bar boundary according to the new bar width, the computation of a second displacement value to be applied to the right bar boundary, the displacement of the left bar boundary according to the first computed displacement value and the displacement of the right bar boundary according to the second computed displacement value.

4. The method of claim 1, where in the case of a stroke made of a curved stem, the steps of enlarging the width of a stroke and of modifying the placement of a curved stem are combined into one large step comprising the computation of the new stem width, the computation of the phase of the contour of character "O" for capital letters, respectively of character "o" for lower-case letters at the optical correction point, the determination of the location of said phase closest to the external curved stem contour extremum, the computation of a first displacement value to be applied to the external curved stem contour extremum in order to move it to the previously determined phase location, the determination of a new internal curved stem contour extremum by subtracting in the case of a positive curved stem orientation, respectively by adding in the case of a negative curved stem orientation, to the previously determined phase location said new stem width, the computation of a second displacement value to be applied to the internal curved stem contour extremum in order to move it to the previously determined new internal curved stem contour extremum, the displacement of the external curved stem contour by said first displacement value and the displacement of the interior curved stem contour by said second displacement value.

* * * * *